United States Patent [19]

Schaffner

[11] Patent Number: 4,711,622

[45] Date of Patent: Dec. 8, 1987

[54] PELLET MILL

[75] Inventor: Hanspeter Schaffner, Niederuzwil, Switzerland

[73] Assignee: Gebruder Buhler AG, Uzwil, Switzerland

[21] Appl. No.: 744,056

[22] Filed: Jun. 12, 1985

[30] Foreign Application Priority Data

Jul. 4, 1984 [CH] Switzerland .................. 3220/84

[51] Int. Cl.$^4$ ................................................ B28B 3/20
[52] U.S. Cl. ............................ 425/331; 425/DIG. 230
[58] Field of Search ............... 425/331, 204, 192 R, 425/DIG. 230

[56] References Cited

U.S. PATENT DOCUMENTS

| | | |
|---|---|---|
| 2,240,660 | 5/1941 | Meakin ......................... 425/331 X |
| 2,764,951 | 10/1956 | Fisher ........................... 425/331 |
| 2,798,444 | 7/1957 | Meakin .......................... 425/204 |
| 2,908,038 | 10/1959 | Meakin ........................ 425/192 R |
| 3,191,227 | 6/1965 | Keefe ............................ 425/331 |
| 3,280,426 | 10/1966 | Meakin ................... 425/DIG. 230 |
| 3,307,501 | 3/1967 | Wenger ......................... 425/331 |
| 3,332,111 | 7/1967 | Hafliger ...................... 425/331 X |
| 3,382,818 | 5/1968 | Landers ......................... 425/331 |
| 3,538,546 | 11/1970 | Gilman ....................... 425/331 X |
| 3,581,678 | 6/1971 | Landers ...................... 425/331 X |
| 3,723,042 | 3/1973 | Raydt ............................ 425/331 |
| 3,932,091 | 1/1976 | Vink .............................. 425/331 |
| 3,981,664 | 9/1976 | Bittner et al. ................. 425/331 |
| 4,446,086 | 5/1984 | Molenaar et al. .......... 425/331 X |

FOREIGN PATENT DOCUMENTS 3121613 5/1981 Fed. Rep. of Germany .

Primary Examiner—Richard L. Chiesa
Attorney, Agent, or Firm—Merchant, Gould, Smith, Edell, Welter & Schmidt

[57] ABSTRACT

A pellet mill comprises a die which may rotatably be driven by a suitable drive. At least one press roller engages the inner surface of this die, and material to be pelleted is fed to this press roller by means of a deflector blade situated before. This deflector blade is arranged at least 45° before the related press roller—as seen in the direction of the rotation of the die—so that a free space of at least 45° will result therebetween. Within this free space, the centrifugal force due to the rotation of the die becomes effective and contributes to a better distribution of the material.

29 Claims, 3 Drawing Figures

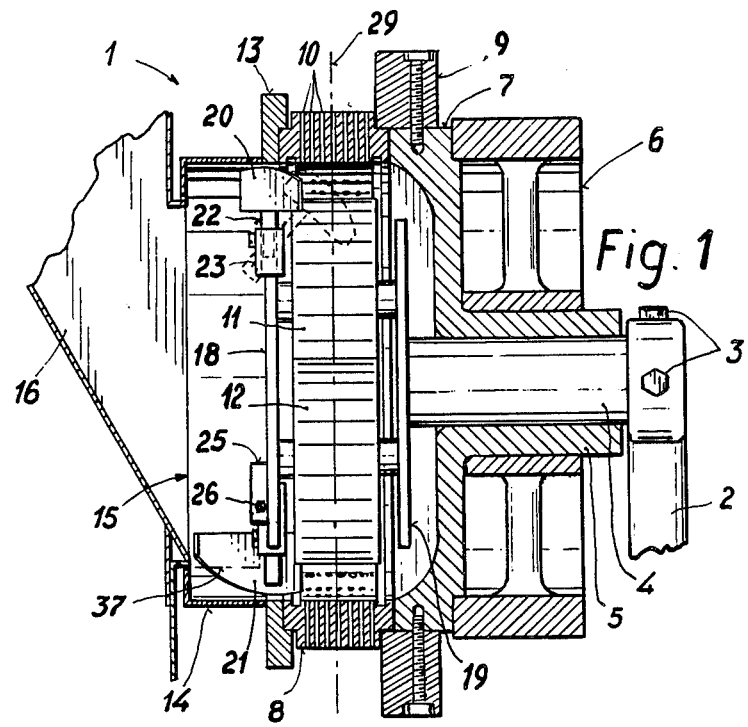
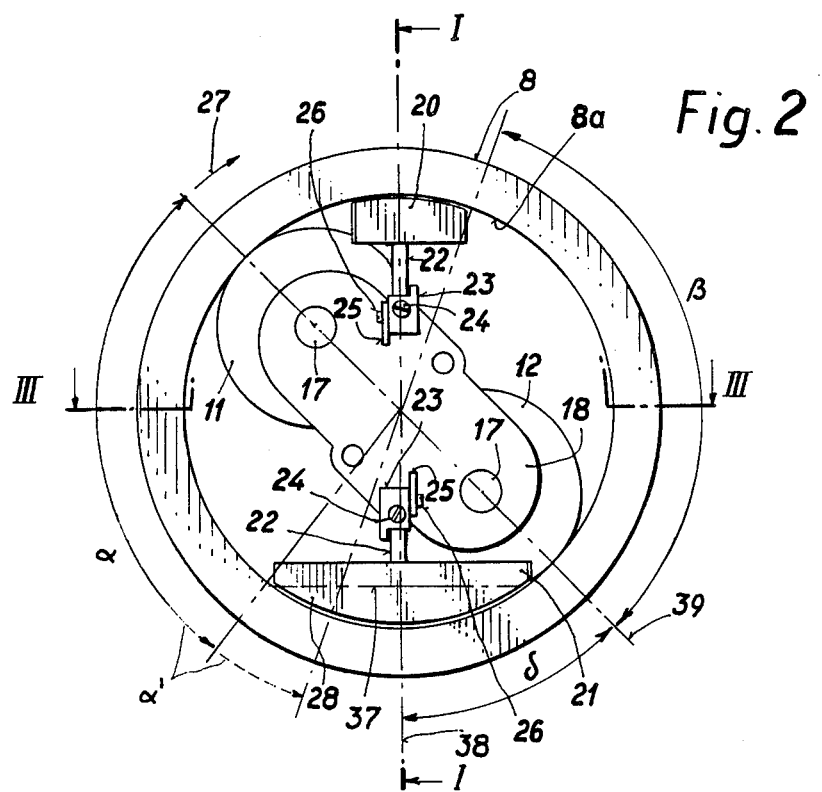

PELLET MILL

FIELD OF THE INVENTION

The invention relates to a pellet mill comprising a substantially cylindrical ring-like die that may be driven by means of a drive, wherein the inner surface of the die is engaged by at least one press roller to which the material to be pelleted is fed by means of a deflector blade situated before the press roller—as seen in the direction of rotation of the die—and being inclined to the axis of rotation of the die.

BACKGROUND OF THE INVENTION

In usual pellet mills of this type (note e.g. the German Specification No. 3,121,613 or U.S. Pat. Nos. 2,764,951 2,798,444 or 2,908,038), the material to be pelleted is guided immediately to the press rollers via bent or tortuous deflector blades. Normally, at least one press roller, but in some cases also three such rollers, are used. Thereby, the deflector blades are arranged in such a manner that their respective end is situated immediately before the related press roller. Two types of solutions were hitherto applied for this purpose: either the pertaining deflector blade extended over the whole axial length of the die (see U.S. Pat. No. 2,798,444), or it was attempted to arrange the deflector blades outside the die, as far it is possible, so as they projected into the interior of the die only over part of the axial width of the latter. In the former case, it was a disadvantage that the deflector blades had to be located in the relatively narrow space within the die, whereby the uniformity of the supply of the material to be pelleted was improved, in comparison with the latter construction, but was ensured by no means; in general, the uniformity was dependent to a high extent upon the supply quantity of the preceding supply devices.

Therefore, one preferred to make allowance for a higher non-uniformity, if only a greater portion of the deflector blades could be mounted outside the die. Since, however, the deflector blades are only intended to equalize the supply, this measure had not the desired success. It was therefore already suggested in U.S. Pat. No. 3,723,042, to arrange the deflector blades immediately before the press rollers to extend over the entire width of the same, but to locate the press rollers to engage the outer circumference of the die. Actually, this leads to an unfavorable distribution of the forces acting on the press roller and on their bearings on the one hand, and to a relatively complicated shape of the deflector blades on the other hand; finally, the arrangement was extraordinarily bulky and expensive.

SUMMARY OF THE INVENTION

It is an object of the invention to design a pellet mill of the aforesaid type in a constructively simple and uncomplicated manner, but nevertheless to take care for a uniform supply of the material.

The invention starts from the cognition that just when pelletting with a rotating die a force is created that may contribute to render uniform the supply of the material, i.e. the centrifugal force. Thus, the invention consists essentially in that the deflector blade is arranged at an angle of at least 45° before the press roller, whereby a free space of at least 45° is provided between the deflector blade and the pertaining press roller. By the resulting space, the supplied material will be fed to the inner surface of the die at a relatively large circumferential distance before the press roller and can be spread, due to the free space provided, over the entire inner surface, preferably exclusively under the action of the centrifugal force, but if desired also by means of additional distributing devices, before it is pressed through the perforations of the die by the press roller.

It is especially preferred, when the deflector blade is arranged at an angle of at least 90° before the press roller particularly immediately after the previous press roller, as seen in the direction of rotation of the die. With such a construction, a particularly large free space between deflector blade and the pertaining press roller is obtained, whereby in the case of a single press roller "the previous press roller" is one and the same.

It has already been mentioned that it is known to arrange the deflector blades outside the die, as much as possible, and to let them protrude only to a small extent into the interior of the die. However, especially in connection with the intended utilization of the centrifugal force for distributing the material supplied, it is of advantage to have the deflector blades protrude only to a maximum of one third in axial direction of the die or in case to join them even outside to the die. In this way, the centrifugal force can exert its effect undisturbed by parts protruding into the interior of the die.

It is suitable especially in respect to the utilization of the centrifugal force, when the die has an appropriate circumferential speed, since additional distributing devices inside the die can then be fully avoided. Thus, it is of advantage, when the die is driven at a circumferential speed of at least 3 meters per second, preferably with 5 meters per second minimum, and particularly at about 7 meters per second.

In accordance with the above explanations, the material to be pelleted is thus supplied with the aid of the inclined deflector blades and should be spread over the inner surface of the die, especially under the effect of the centrifugal force. Under these conditions, however, the angle of the plane of the deflector blade to the central plane of the die is of importance, especially the minimum angle. The deflector blades had hitherto always a wound shape, and one believed that the supply conditions could thus be improved. Should such a wound shape be applied, the expression "plane of the deflector blade" is to be understood as a middle tangential plane, but practical experience has proven that simple and non-curved deflector blades with even surfaces can be used, due to the present design, so that their manufacturing is facilitated. In this connection it is of advantage, if the angle of the plane of the deflector blades to the center plane of the die is between 20° and 40°, preferably between 25° and 30°, and especially about 27°.

Since, in general, pellet mills should be operable with different materials and different dies of varying diameters, it is favorable, if the mill is adaptable to the various conditions. Therefore, it is desirable that if the angle of the plane of the deflector blade to the central plane of the die be adjustable by means of an angle setting device, in which case preferably a limiting device for at least one limit of adjustment is provided, particularly comprising at least one abutment surface. In the simplest case, a limit mark (notch, scale mark or the like) may be sufficient as a limiting device, but of course, a limit stop is preferred in order to avoid mistakes in operation.

Tests have proven that with certain relationships of the angle of the plane of the deflector blade to the central plane of the die, measured in degrees, and of the circumferential speed of the die, it is possible to obtain an optimum in the uniformity of the supply of material. It is therefore preferred that the relationship of the angle of inclination—measured in degrees—of the plane of the deflector blade to the central plane, to the circumferential speed—measured in meters per second—of the die at its inner surface lies between 3.4:1 and 4.4:1. preferably between 3.8:1 and 4.0:1, especially at about 3.86:1.

In practice, a further function may easily be assigned to a deflector blade, which function could not be fulfilled with the known constructions. Namely, in all pellet mills hitherto used, there was the problem that when the drive for the die was switched off, the material (remaining in the supply conduit, in a special supply chamber, but mostly in the die cover fastened to the rotatable die) could reach the inner surface of the die in an uncontrolled manner, thereby soiling and clogging it. From that, difficulties resulted when the mill started again and cleaning of the die was more troublesome.

This problem can be solved by providing a deflector blade within the range of the lower portion of the die, which is arranged with a vertical central plane, said blade extending transversely and at least up to the height of the normal level of the material supplied during operation of the mill. Preferably, this deflector blade comprises an extension bent out of the plane of the blade and extending in particular parallel to the central plane of the die, so that the supply of material is blocked when the die stands still, but with rotating die and rotating supply chamber, or with rotating die cover, the material is entrained by the supply chamber or die cover and may be fed to the inclined deflector blade. Such a construction is also suitable for deflector blades that, contrary to the proposed arrangement, are located immediately before the press roller. Since the supply chamber or the die cover has a special function in entraining the material, in this case, it may be advantageous, if the supply chamber or the die cover has entraining means, e.g. in the form of vanes of limited radial extension, of buckets or the like that rotate together with this chamber or cover.

In order to provide sufficient space for the deflector blade located in the lower region of the die which has its central plane vertically arranged, on the one hand, and to ensure the desired free space between deflector blade and press roller, the design is preferably realized in such a manner that the press roller, or one press roller, is arranged in at an acute angle with respect to a vertical plane through the axis of the die, preferably at about 30° to 60°, particularly at about 45°.

BRIEF DESCRIPTION OF THE DRAWINGS

Further details will become apparent from the following description of an embodiment of the invention schematically illustrated in the drawings.

FIG. 1 is a vertical cross-section through the pellet mill along the line I—I of FIG. 2;

FIG. 2 is a side elevation of the die together with the press rollers and the deflector blades.

DETAILED DESCRIPTION OF THE DRAWINGS

Figure 3:
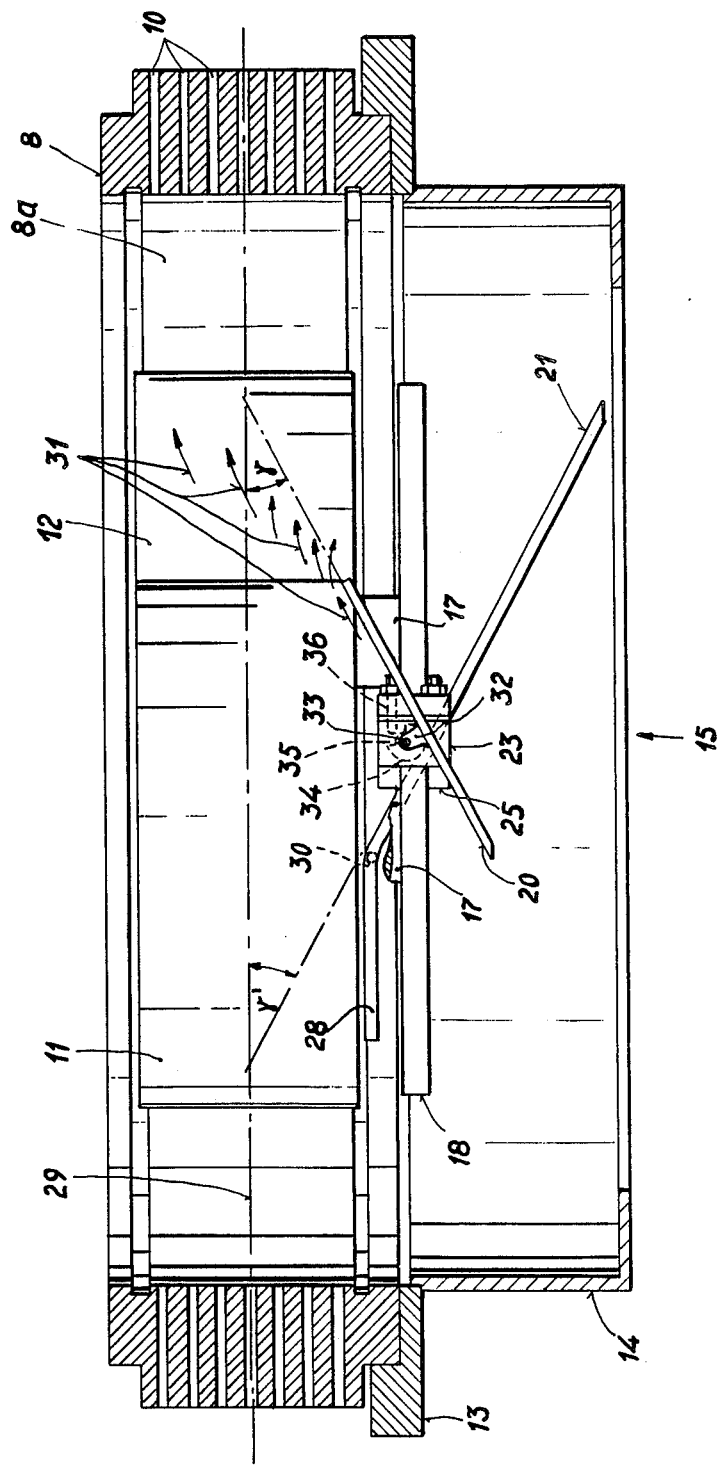
FIG. 3 shows a cross-section along the line III—III of FIG. 2, in which parts of less importance have been omitted.

A pellet mill 1 comprises an axis 4 mounted on a stand 2, not illustrated in detail, by means of fixing bolts 3, on which axis a rotor 5 is supported. A belt wheel 6 is connected to the rotor 5 in a manner not shown, but known per se, e.g. by wedging on, by shrink-fastening or by means of fixing bolts, in order to drive the rotor 5.

On one side, the rotor 5 has a hollow flange 7, onto which a die 8 is fixed with the aid of a clamp ring 9 or by other fastening means, so that they may rotate together. The die 8 has perforations 10 distributed over its whole circumference, as known per se, through which the material to be pelleted is pressed to produce the desired pellets. To this end, as best seen in FIG. 2, two press rollers 11 and 12, described later in detail, are arranged inside the die 8.

A die cover 14 is fastened to the die 8 via a fastening ring 13 so as to rotate with it, when the wheel 6 is driven by a motor (not shown). The die cover 14 has an inlet opening 15, into which a supply hopper 16 protrudes in a known manner.

The press rollers 11, 12 are each rotatable about an axle 17 (FIG. 2), both axles 17 being supported by two plates 18, 19. The plate 19 is fixed to the fastened axis 4. The above described parts are of usual construction and may be modified in any manner known per se; for example, the press rollers 11, 12 may be corrugated around their circumference.

A deflector blade 20 or 21 (the latter being shown in a non-cross-sectional view in FIG. 1) is assigned to each one of the two press rollers 11 and 12. The deflector blades 20, 21 are connected to rods 22 (FIG. 2) that are inserted into holders 23 mounted on the plate 18, and are fastened there by a respective clamp screw 24 so that they are adjustable in height. Suitably, the two holders 23 are fastened to the plate 18 with the aid of wings 25 welded to the plate 18, the azimuth angle of the radially outer edge of the deflector blades 20, 21 with respect to the inner wall surface 8a of the die 8 may be set in any position desired (note the position of the deflector blade 20 shown in dotted lines in FIG. 1) by means of a clamping screw 26.

As best seen from FIGS. 2 and 3, the lower deflector blade 21, that guides the material to be pelleted to the press roller 11, is arranged at a relatively large distance before (with respect to the direction of rotation of the die 8 indicated by an arrow 27 in FIG. 2) this press roller 11. FIG. 3 shows that the deflector blade 21 has an extension 28 at its end facing the die 8, said extension 28 extending parallel to the transverse central plane 29 of the die 8 indicated in dash-dotted lines. This extension 28 is bent out of the plane of the proper deflector blade 21, whereby the bending angle may be adjusted, if desired, to which end an axle 30 may be provided, as shown in FIG. 3. The purpose of this extension 28 will be described later. In any case, it may be seen in FIG. 2 that the front end of the extension 28 is situated before the press roller 11 an angular distance α, and that the front edge of the proper deflector blade 21 at the transition to the extension 28 is offset by an angle α' before the press roller 11. This angle α', but suitably also the angle α, should amount at least 45°. However, in the case of the arrangement shown, the angle is considerably larger, especially due to the fact that the deflector blade 21 is located immediately after the press roller 12, as is illustrated, which is situated before the press roller 11, with respect to the direction of rotation indicated by the arrow 27.

Similar relations exist between the deflector blade 20 and the pertaining press roller 12. The front edge of the deflector blade 20 facing the press roller 12 (note FIG. 2) or the die 8 (note FIG. 3) is situated an angular distance β (FIG. 2) from that location in which the press roller 12 engages the inner surface 8a of the die 8, thereby forming a nip, said angular distance amounting at least 45°. It may be seen, however, that this angle in the present embodiment is also considerably larger, since the deflector blade 20 is arranged relatively closely after the press roller 11 preceding the press roller 12.

During operation of the pellet mill 1, i.e. when the die 8 is driven and rotates in the direction of the arrow 27 (FIG. 2), the material to be pelleted, which is supplied via the stationary supply hopper 16, is entrained by the corotating die cover 14. If desired, the die cover 14 may be provided with depressions or grooves defined by radial walls in the manner of a bucket wheel. This type of supply is only described by way of example, and it has already been suggested too, to feed the material from the side of the drive, i.e. from the side of the flange 7, through a supply chamber in which, for example, a mixer may be arranged. In such a case, it will be understood that the deflector blades 20, 21 would be mounted on the side facing the rotor 5 and its flange 7, e.g. on the plate 19.

The entrainment of the supplied material by the die cover 14 is effected, depending upon the nature of the material, predominately under the influence of the centrifugal force, or under the influence of the adhesion, if the material is of sticky nature. In this way, the material is fed first along the deflector blade 21 and its extension 28 which extend over the whole axial width of the die cover 14, and is scraped off by the deflector blade 20, extending only over a part of the axial width of the die cover 14 (note FIGS. 1 and 3), on the upper side. The material scraped off in this manner by the deflector blade 20 is guided under the pressure of the oncoming material against the inner surface 8a of the die 8, therein being spread by centrifugal force, developed during rotation of the die 8, over the inner surface 8a, especially in case of a dough-like consistency of the material (e.g. for the production of feed pellets). This event is indicated by arrows 31 in FIG. 3. From the course of the arrows 31, it may be seen why it is necessary to arrange each deflector blade 20 or 21 an angular distance α' or β (FIG. 2) before the pertaining press rollers 11 or 12, when centrifugal force is utilized to build a uniform layer of the material on the inner surface 8a.

Precisely, a certain distance or time is required until an effect of uniformity is achieved. It has been found that an angle of at least 45° may be sufficient for attaining this effect, but it is to be understood that the uniformity is the greater, the larger the angle α' or β is chosen. The largest possible angle α' or β will result in any case, when the respective deflector blade 20 or 21 is situated close behind the preceding press roller 12 or 11 (seen in opposite sense of the arrow 27 of FIG. 2).

From the above, it may be understood that the magnitude of the centrifugal force on the inner surface 8a is dependent upon its circumferential speed. There, there are no upper limits, because, actually, the centrifugal force and its distribution effect will also increase with increasing circumferential speed; but this speed should not fall below 3 meters per second, preferably not below 5 meters per second. A circumferential speed of 7 meters per second led to good results in practical tests.

From the arrows 31 of FIG. 3, it will also be seen that the correct setting of the angle γ is of importance, between the plane of the deflector blade 20 and the central plane 29 of the die 8. In known constructions, the deflector blades, located immediately before the press rollers, are bent or have a tortuous shape that should have led to a better distribution of the supplied material. To the contrary, it may be clearly seen from FIG. 3 that with the arrangement of the deflector blades 20, 21 according to the invention and with utilizing the centrifugal force to distribute the material, the deflector blades 20, 21 may be flat and thus simpler. If, however, due to any reason, bent or tortuous deflector blades are used, the angle γ corresponds to that angle which is comprised between a middle tangential plane of the blade and the central plane 29 of the die 8. Depending upon the circumferential speed of the inner surface 8a and upon the nature of the supplied material, the angle γ (or, in the case of the deflector blade 21, the angle γ') should suitably be chosen between 20° and 40°, preferably between 25° and 30°. In the application for producing feed pellets, an angle of about 27° (±1° in dependence upon the composition of the material) has been found most favorable.

The angle γ' has been mentioned above comprised between the plane of the deflector blade 21 and the central plane 29. The aforesaid will apply to it in analogous manner. In this connection, attention is drawn to the fact that part of the material entrained by the die cover 14 has been scraped off by the relatively short deflector blade 20, and the remaining material has spread over the cylindrical surface of the cover again due to the action of the centrifugal force. With further rotation of the die cover 14, the material is totally scraped off by the deflector blade 21 that extends over the whole axial width of the die cover 14 (note FIGS. 1, 3). Since the angular distances α' and β (FIG. 2) in no case need to be of equal dimension, it may be appropriate to give also a different dimension to the angles γ and γ'.

It has already been mentioned that the angles γ and γ' are dependent, amongst other conditions, upon the nature of the material to be pelleted. Therefore, it may be desirable to alter the angle when another material is used. To this end, an angle setting device may be provided, as is illustrated in FIG. 3. In this construction, the deflector blade 20 is positioned with an ear 32 onto an adjusting shaft 33 and may be adjusted and fixed by a clamping screw not shown in any position desired. Since, as mentioned before, the adjusting range for the angle γ lies suitably between 20° and 40°, a revolving body 34 with a cut-out 35 may be connected to the adjusting shaft 33 into which cutout an abutment screw is protruding. The radial limiting walls of this cut-out 35 will then form counter-abutment surfaces for the screw 36 so that the adjustment is limited to the setting range between 20° and 40°. In this way, mistakes will be avoided, on the one hand, and on the other hand even when the clamped deflector blade becomes loose, it cannot turn wherever.

It is to be understood that the setting device 33 to 36 for adjusting the angular position of the deflector blade 20 may also be designed in a different manner, if desired, whereby notches for the different angular positions may be provided in cases. It is also conceivable to design the setting device in such a manner that a fine adjustment is possible by turning a setting screw.

An analogous setting device may be provided for the lower deflector blade 21, whereby a displacement of the extension 28 out of parallel with the central plane 29 need not be necessarily a drawback, but in case, also a correction of the bending angle at the above-mentioned axle 30 may be effected. In this connection, it may be desirable to provide an elastic sealing at that end of the deflector blade which faces the inlet opening 15 in order to ensure a tight closure against the vertical wall of the cover 14, even when altering the angle $\gamma'$.

When the drive of the pellet mill 1 is switched off, the material, entrained during the rotation of the die cover 14, will flow downwards and it is unavoidable that a certain amount of material will still flow out of the supply hopper 16. Thus, a certain residue of material or a material sump will result, when the pellet mill 1 stands still, which will attain a certain level, indicated by a dash-dotted line 37 in FIGS. 1 and 2, as is known from experience. With the usual pellet mills, this residue of material discharges onto the inner surface 8a of the die 8, where it will clog the perforations 10 and will finally harden, as further nuisance, when the press stands still for a period long enough. From that, maintenance and cleaning operations become extremely difficult. In order to obviate this inconvenience, the deflector blade 21 is mounted in the lower part of the die cover 14, thus closing the same up to the level 37. This means that the deflector blade 21 has to reach up to at least the normal level 37, that its lower edge fits onto the curvature of the die cover 14 (the curved shape of the deflector blade 21 in FIG. 1 results due to the fact that the deflector blades 20, 21 are shown in their entirety, whereas the die cover 14 is illustrated in cross-section), and that the back end of the deflector blade 21, facing the supply opening 15, extends over the whole axial width of the cover 14, at least up to the level 37. For its distributing function, the deflector blade 21 could also be formed without the extension 28, but the extension 28 serves as a blocking means when the pellet mill is switched off, but prevents also an uncontrolled flow of material during operation of the press. This is one reason why the deflector blades 20, 21, particularly the latter, are arranged outside the interior of the die 8, as best seen from FIG. 3; a further reason is, of course, that the interior of the die 8 should be obstructed as little as possible. With another shape and arrangement of the deflector blade 21, the extension 28 may be omitted, in case. For example, the deflector blade 21 could be bent (with respect to the illustration of FIG. 3) in such a way that the plane of the end, facing the die 8, forms an angle $\gamma'$ with the central plane 29, whereas the back end, facing the supply opening 15, comprises a larger angle with this plane 29. It is to be understood, however, that the arrangement of the extension 28 leads to a simpler shape and additionally to a better guiding effect of the deflector blade 21, also within the range of its back end, as well.

From the blocking effect of the deflector blade 21, it will be understood why the material, fed through the supply hopper 16, reaches first the upper deflector blade 20, and is only then picked up by the deflector blade. Furthermore, this explains why the press rollers 11, 12 are arranged under an angle $\delta$ to a vertical plane 38, as is shown in FIG. 2. In this way, on the one hand there will be sufficient space for locating the deflector blade 21 within the lower region of the die 8, on the other hand, although the geometrical axis 39 through the axles 17 could be horizontally arranged, to avoid a diminuation of the respective angular distance $\alpha'$ and $\beta$, that would certainly result in the last-mentioned case. The illustrated inclination of the axis 39 and there deviation by an angle $\delta$ with respect to the vertical plane 38 will thus result in an optimum in any regard, because the greatest possible angle $\delta'$ and $\beta$ is achieved in spite of the location of the deflector blade 21 within the lower range of the die 8. This acute angle $\delta$ amounts preferably between about 30° and 60°, and especially approximately 45°. Of course, this angle may be even larger, if the advantage of utilizing the centrifugal force for distributing the material over the inner surface 8a be abandoned doned and the press roller 11 be located immediately close after the extension 28. In this case, however, more complicated shapes of the deflector blades would have to be chosen.

In connection with the angle setting device 33 to 36, the facilities, to set the azimuth angle by loosening the screws 26, and to adjust the height position of the blades by releasing the screws 24, are of particular advantage. If the dies 8 used are of uniform size in diameter, it may be even suitable, to combine the setting or adjusting devices in such a manner that the azimuth angle, i.e. the angle of the rods 22 to their vertical position (with respect to FIG. 1), is automatically correspondingly adapted when the angle $\gamma$ or $\gamma'$ is adjusted. Furthermore, the setting devices shown may be differently constructed, for instance, the rod 22 (FIGS. 1, 2) may also take over the function of the shaft 33.

Although it is preferred that the deflector blades 20, 21 are located outside the interior of the die 8, in the manner shown in FIG. 3, it may result in other designs that at least one deflector blade projects slightly into this interior. In fact, this is the case with the front end of the deflector blade 20, where an increase of its angle $\gamma$ will lead to an arrangement in which this front end projects still further into the interior of the die 8. However, it is suitable, when the deflector blades don't project more than one third of the axial width of the die 8 into its interior, on the one hand in order to keep this space free from structural members, on the other hand because otherwise the distribution of the material by the effect of the centrifugal force would be impeded. If, however, one doesn't hesitate to accommodate additional elements in the interior of the die 8, distribution means—such as nozzles, wipers or distribution rollers—may be arranged within the free space $\alpha'$ or $\beta$ (note FIG. 2); but it is to be understood that such distribution means can be avoided and that it is more favorable to utilize the centrifugal force. Therefore, it is preferred to leave this free space from any structural element.

When in the foregoing description it has been mentioned that the circumferential speed at the inner surface 8a of the die 8 as well as the angles $\gamma$ or $\gamma'$ are important parameters, it remains to say that it is favorable, if a certain ratio of these two parameters is maintained. Supposing that the angle $\gamma$ and $\gamma'$ is measured in degrees (i.e. with 360° for the full circle) and the circumferential speed is measured in meters per second, optimum ratios have been found between 3.4:1 and 4.4:1, particularly between 3.8:1 and 4.0:1. From that, it may be seen that these relationships are suitably given within a relatively close range of ratios, partly even not differing by a whole number. In practice, it has been found that an optimum in the production of feed pellets will be attained with a ratio of about 3.86:1. It is clear, however, that the present pellet mill is also applicable for other materials, e.g. for processing garbage and waste material to a refuse derived fuel, in which case possibly other relationships may be relevant.

Numerous modifications are possible within the scope of the invention, for example, the various setting or adjusting devices may be formed in a different manner or may even be omitted on one or both deflector blades.

I claim:

1. A pellet mill for forming pelleted material, comprising:
   perforated die means being substantially cylindrical and rotatable about a first axis, said die means having a cylindrical inner surface extending over a predetermined axial width in the direction of said first axis, said width being divded into two halves by a central transverse plane intersecting said first axis;
   drive means for rotating said die means in a predetermined direction of rotation with at least one circumferential speed of said inner surface;
   a first rotatable press roller engaging the inner surface of said die means at a first location to press material through the perforations of said die means;
   a second rotatable press roller engaging the inner surface of said die means at a second location diagonally opposite the first location to press material through the perforations of said die means; and
   supply means for feeding material to be pelleted into said die means, said supply means including cover means defining an inlet secured to said die means, and first stationary deflector means positioned in said cover means arranged at leat in part in plane being inclined relative to said first axis and to said central transverse plane for guiding said pellet material towards said first press roller, said first deflector means having a lower arcuate edge facing the inner surface of said die means, and being of sufficient height and situated at a first angle of at least 45° before said first press roller with respect to said first axis and said direction of rotation in order to block feed of material into said die means when stopped, while leaving a free interspace of at least 45° between said first deflector means and said first press roller to facilitate distribution of material under centrifugal action over the inner surface of said die means when rotating;
   said first stationary deflector means including a straight portion extending diagonally across said cover means, and a bent portion extending generally parallel to the central plane.

2. A pellet mill as claimed in claim 1, wherein said deflector means are arranged at least 90° before said press roller.

3. A pellet mill as claimed in claim 1, further comprising second deflector means arranged at least 45° before said second press roller.

4. A pellet mill as claimed in claim 1, wherein said deflector means extend into said die means a maximum of one third of the axial width of said inner surface.

5. A pellet mill as claimed in claim 4, wherein said deflector means are arranged substantially outside said die means and extend adjacently to said inner surface.

6. A pellet mill as claimed in claim 1, wherein said circumferential speed amounts to at least 3 meters per second.

7. A pellet mill as claimed in claim 6, wherein said circumferential speed amounts to at least 5 meters per second.

8. A pellet mill as claimed in claim 7, wherein said circumferential speed amounts to about 7 meters per second.

9. A pellet mill as claimed in claim 1, wherein the plane of said deflector means is inclined relative to said central plane by an angle of between 20° and 40°.

10. A pellet mill as claimed in claim 9, wherein the plane of said deflector means is inclined relative to said central plane by an angle of between 25° and 30°.

11. A pellet mill as claimed in claim 10, wherein the plane of said deflector means is inclined relative to said central plane by an angle of about 27°.

12. A pellet mill as claimed in claim 1, further comprising first setting means for adjusting the angle of inclination of said deflector means.

13. A pellet mill as claimed in claim 12, further comprising limiting means for the adjustment of said angle.

14. A pellet mill as claimed in claim 13, wherein said limiting means comprise abutment means.

15. A pellet mill as claimed in claim 14, wherein the relationship of the angle of inclination—measured in degrees—of said deflector means relative to said central plane, to said circumferential speed—measured in meters per second—of said inner surface, is between 3.4:1 and 4.4:1.

16. A pellet mill as claimed in claim 15, wherein said relationship is between 3.8:1 and 4.0:1.

17. A pellet mill as claimed in claim 16, wherein said relationship is about 3.86:1.

18. A pellet mill as claimed in claim 1, further comprising second setting means for adjusting the angle between said lower arcuate edge and said cylindrical surface.

19. A pellet mill as claimed in claim 1, further comprising adjusting means for adjusting the distance between said lower arcuate edge and said cylindrical surface.

20. A pellet mill for forming pelleted material, comprising:
   perforated die means being substantially cylindrical and rotatable about a first axis, said die means having a cylindrical inner surface extending over a predetermined axial width in the direction of said first axis, said width being divided in half by a vertical transverse plane intersecting said first axis;
   drive means for rotating said die means in a predetermined direction of rotation with at least one circumferential speed of the inner surface thereof;
   a first press roller rotatable about a second axis parallel to said first axis, said first press roller engaging the inner surface of said die means at a first location offset from a vertical longitudinal plane through said first axis to press material through the perforations of said die means;
   a second press roller rotatable about a third axis parallel to said first and second axes, said second press roller engaging the inner surface of said die means at a second location diagonally opposite the first location to press material through the perforations of said die means; and
   supply means for said pellet material, said supply means comprising die cover means forming a cylindrical housing of predeptermined axial width and being fixed to the front of said die means for common rotation, with inlet means for said pellet material to be received by said housing, and deflector means arranged at least in part in a plane being inclined relative to said first axis and to said transverse and longitudinal planes for guiding said pellet material from said housing and into said die means when rotating, said deflector means being of sufficient height and situated entirely in the lowermost region of said die cover means with a straight portion diagonally crossing said longitudinal plane through said first axis and a bent portion extending parallel to said transverse plane, to prevent direct access of material from said housing to the inner surface of said die means when stopped.

21. A pellet mill as claimed in claim 20, wherein said deflector means extend substantially over the whole axial width of said housing.

22. A pellet mill as claimed in claim 20, wherein said first location is offset from said vertical plane by an acute angle with respect to said first axis.

23. A pellet mill as claimed in claim 22, wherein said acute angle is between 30° and 60°.

24. A pellet mill as claimed in claim 23, wherein said acute angle is about 45°.

25. A pellet mill for forming pelleted material, comprising:

perforated die means being substantially cylindrical and rotatable about a first axis, said die means having a cylindrical inner surface extending over a predetermined axial width in the direction of said first axis, said width being divided into two halves by an at least substantially central vertical plane intersecting said first axis;

drive means for rotating said die means in a predetermined direction of rotation with at least one circumferential speed of said inner surface;

a first press roller rotatable about a axis parallel to said first axis, said roller engaging said inner surface at a first location offset from a vertical plane through said first axis to press said pellet material through the perforations of said die means;

a second rotatable press roller engaging the inner surface of said die means at a second location diagonally opposite the first location to press material through the perforations of said die means;

supply means for said pellet material, said supply means comprising die cover means forming a housing of axial width and being fixed to the front of said die means for common rotation, and including inlet means for said pellet material to be received by said housing, and deflector means arranged at least in part in a plane being inclined relative to said first axis and to said central plane for guiding said pellet material out of said housing and towards said press rollers said deflector means being situated in the lowermost region of said die cover means, thus crossing said vertical plane through said first axis, to prevent direct access to said pellet material from said housing to said inner surface;

said deflector means including extension means bent out of the inclined plane to block the whole lowermost segment of predetermined height of said die means against direct access of the pellet material from said housing; and said extension means being arranged substantially parallel to said central plane.

26. A pellet mill, which comprises:

a perforated cylindrical die mounted for rotation about a longitudinal axis, said die having an inner surface of predetermined axial width and an open front end, said width being divided in half by a vertical transverse plane intersecting said longitudinal axis;

means for effecting rotation of said die in a predetermined direction about the longitudinal axis;

a cover secured to the front end of said die for rotation therewith, said cover including upper and lower ends and an inlet opening;

a pair of rotatable press rollers located in the interior of said die and engaging opposite locations on the inside surface thereof, said press rollers being arranged diagonally;

means for feeding material to be pelleted through the inlet opening of said cover for pressing by said rollers through said perforated die to form pelleted material;

a lower deflector positioned in the bottom end of said cover and across the lower front end of said die, said lower deflector having a bottom arcuate edge of similar curvature to said cover and being of sufficient height and width to substantially block further flow of material into said die when said die is not rotating;

said lower deflector including a straight portion extending diagonally across said cover, and a bent portion extending generally parallel to said transverse plane; and means for adjustably supporting said lower deflector in fixed position but at a predetermined acute angle between about 20° and 40° relative to a central transverse plane bisecting said die in the direction of rotation of the adjacent die portion.

27. The pellet mill of claim 26, wherein said press rollers are oriented on a diagonal line angled at between about 30° and 60° off vertical, and wherein said lower deflector is angularly positioned at least 45° ahead of the next adjacent roller in the direction of rotation of said die.

28. The pellet mill of claim 26, further including:

an upper deflector positioned in the upper end of said cover at a predetermined acute angle to the transverse die plane in the direction of rotation of the adjacent die portion; and means for adjustably supporting said upper deflector in fixed position but at a predetermined acute angle between about 20° and 40°.

29. A pellet mill, which comprises:

a perforated cylindrical die mounted for rotation about a longitudinal axis, said die having an inner surface of predetermined axial width and an open front end;

means for effecting rotation of said die in a predetermined direction about the longitudinal axis;

a cover secured to the front end of said die for rotation therewith, said cover including upper and lower ends and an inlet opening;

a pair of rotatable press rollers located in the interior of said die and engaging opposite locations on the inside surface thereof, said press rollers being arranged diagonally;

means for feeding material to be pelleted through the inlet opening of said cover for pressing by said rollers through said perforated die to form pelleted material;

a lower deflector positioned in the bottom end of said cover and across the lower front end of said die, said lower deflector having a bottom arcuate edge of similar curvature to said cover and being of sufficient height and width to substantially block further flow of material into said die when said die is not rotating;

said lower deflector being substantially flat and including inner and outer portions, relative to said cover inlet opening, the inner portion being turned and extending substantially parallel to the transverse plane; and means for adjustably supporting said lower deflector in fixed position but at a predetermined acute angle between about 20° and 40° relative to a central transverse plane bisecting said die in the direction of rotation of the adjacent die portion.

* * * * *